(12) United States Patent
Erl et al.

(10) Patent No.: US 10,039,233 B2
(45) Date of Patent: Aug. 7, 2018

(54) VARIABLE ANGLE BEET PICK UP DEVICE

(71) Applicant: EXEL INDUSTRIES, Epernay (FR)

(72) Inventors: Andreas Erl, Geiselhöring (DE); Johann Roth, Langquaid (DE)

(73) Assignee: EXEL INDUSTRIES, Epernay (FR)

( * ) Notice: Subject to any disclaimer, the term of this patent is extended or adjusted under 35 U.S.C. 154(b) by 89 days.

(21) Appl. No.: 15/153,822

(22) Filed: May 13, 2016

(65) Prior Publication Data

US 2016/0330909 A1    Nov. 17, 2016

(30) Foreign Application Priority Data

May 13, 2015  (EP) .................................. 15305721

(51) Int. Cl.
*A01D 51/00* (2006.01)
*A01D 33/08* (2006.01)
*A01D 33/10* (2006.01)

(52) U.S. Cl.
CPC ........... *A01D 51/005* (2013.01); *A01D 33/08* (2013.01); *A01D 33/10* (2013.01)

(58) Field of Classification Search
CPC ................... A01D 25/00; A01D 25/04; A01D 17/00–17/22; A01D 33/08; A01D 33/10; A01D 33/14; A01D 51/005
See application file for complete search history.

(56) References Cited

U.S. PATENT DOCUMENTS

| 5,311,684 A * | 5/1994 | Van Dalfsen | A01D 51/005 |
| | | | 209/421 |
| 2016/0242357 A1* | 8/2016 | Mastalir | A01D 51/005 |

FOREIGN PATENT DOCUMENTS

| DE | 2016880 A1 * | 10/1971 | .......... A01D 51/005 |
| DE | 2616514 A1 * | 2/1977 | ............ A01D 17/06 |
| DE | 2616514 A1 | 2/1977 | |
| DE | 2721125 A1 | 11/1978 | |
| DE | 4123611 C1 * | 8/1992 | ............ A01D 33/08 |
| DE | 3217889 C4 * | 11/1996 | ............ A01D 33/10 |
| DE | 202008017567 U1 | 11/2009 | |
| EP | 2172093 A1 * | 4/2010 | ............ A01D 33/10 |

OTHER PUBLICATIONS

International Search Report for EP 15305721.1 dated Oct. 27, 2015.

* cited by examiner

*Primary Examiner* — Alicia Torres
*Assistant Examiner* — Adam J Behrens
(74) *Attorney, Agent, or Firm* — Thompson Coburn LLP; Steven M. Ritchey

(57) ABSTRACT

This pick-up apparatus for picking up harvested root crop defines a pick-up plane and comprises a pick-up section. The pick-up section comprises a pick-up member adapted to pick up the root crop, and a cleaning member. The pick-up member defines a pick-up position with respect to the pick-up plane. The pick-up apparatus comprises a cleaning adjustment device adapted to adjust the position of the cleaning member between at least two cleaning positions, the cleaning positions being different one from another. In each of the cleaning positions of the cleaning member and while the pick-up member is in the pick-up position, the distance of the cleaning member with respect to the pick-up plane is different from the distance of the cleaning member with respect to the pick-up plane in the other cleaning position.

15 Claims, 2 Drawing Sheets

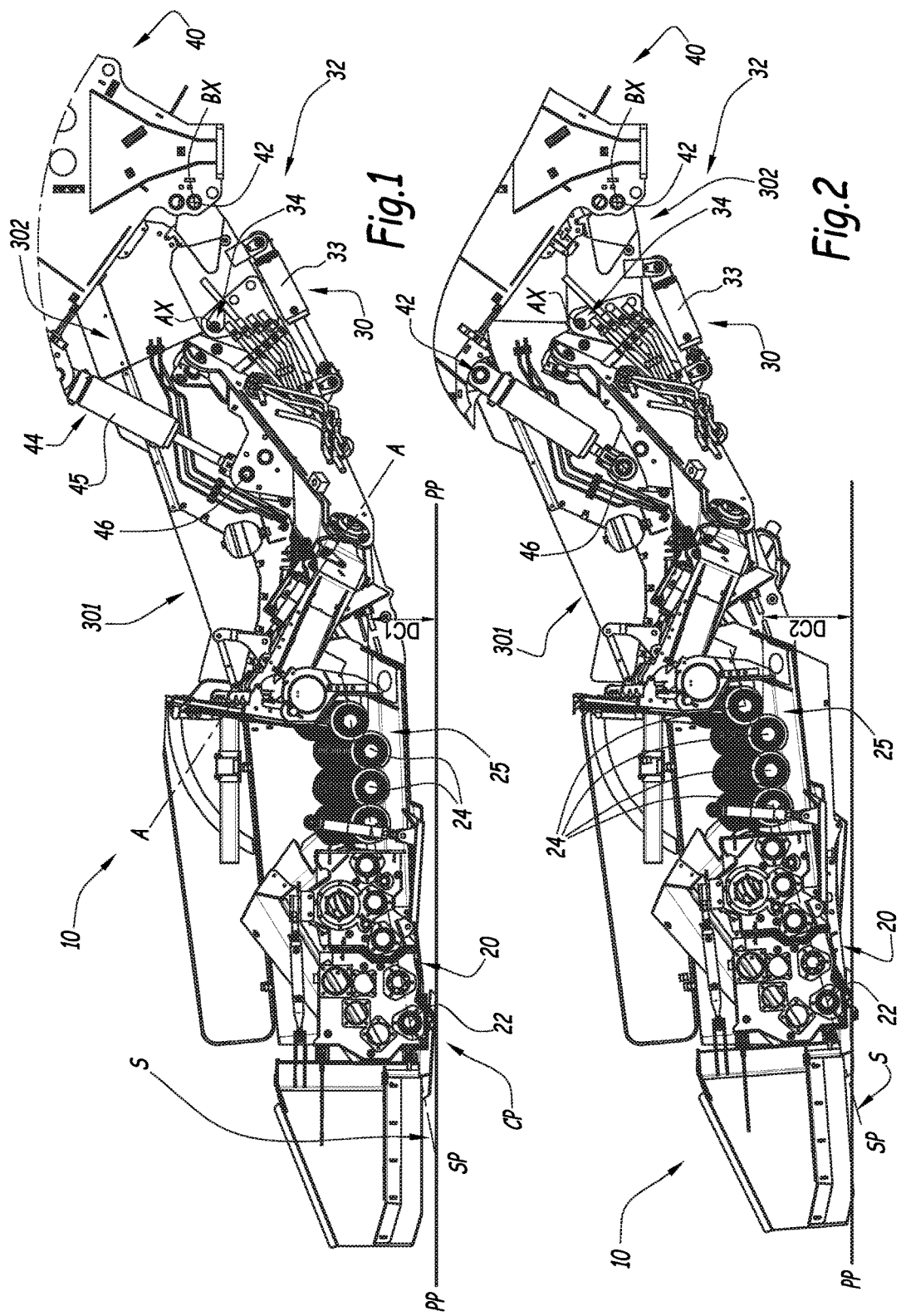

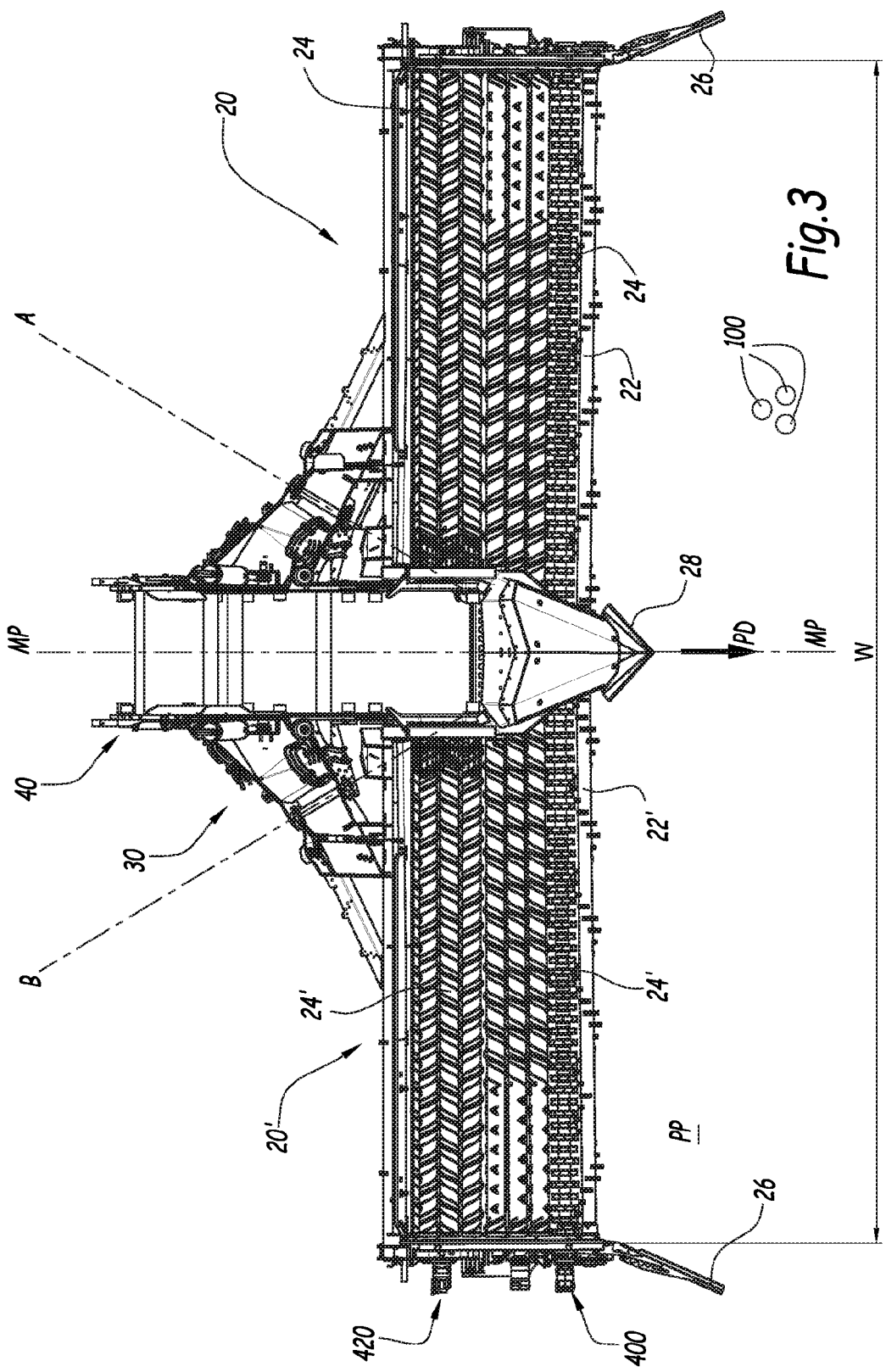

VARIABLE ANGLE BEET PICK UP DEVICE

CROSS-REFERENCE TO RELATED APPLICATIONS

The present application is a non-provisional application claiming the benefit of EP 15305721.1, filed May 13, 2015, which is incorporated herein by reference in its entirety.

FIELD OF THE INVENTION

The present invention concerns a pick-up apparatus for picking up a harvested root crop.

BACKGROUND OF THE INVENTION

Such a pick-up apparatus is known in the prior art by the document EP 2 298 057. However, this kind of pick-up apparatus does not provide full satisfaction.

Indeed, the root crop harvested by the pick-up apparatus is cleaned by a cleaning member of the pick-up apparatus. Therefore dirt of the root crop falls through the pick-up apparatus. The dirt below the pick-up apparatus can pile up, come in contact with the cleaning members and result in wear of the cleaning members or blocking of the cleaning members. This diminishes the yield of the pick-up apparatus.

Accordingly, it is an object of the present invention to overcome the drawbacks of the prior art and to provide a pick-up apparatus that is more reliable and more economic.

SUMMARY OF THE INVENTION

This object is achieved with the above-mentioned pick-up apparatus for picking up harvested root crop, in particular sugar beets,
the pick-up apparatus defining a pick-up plane PP and comprising:
  a pick-up section which
    defines a pick-up direction PD,
    comprises a pick-up member adapted to pick up the root crop, and
    at least one cleaning member adapted to clean the root crop picked up by the pick-up member,
  an intermediate section carrying the pick-up section,
  the pick-up member defining a pick-up position with respect to the pick-up plane PP in which harvested root crop can be picked up by the pick-up member,
  characterized in that
  the pick-up apparatus comprises a cleaning adjustment device adapted to adjust the position of the cleaning member between at least two cleaning positions, the cleaning positions being different one from another, and in that
  in each of the cleaning positions of the cleaning member and while the pick-up member is in the pick-up position, the distance DC1 of the cleaning member with respect to the pick-up plane PP is different from the distance DC2 of the cleaning member with respect to the pick-up plane PP in the other cleaning position.

According to preferred embodiments, the pick-up apparatus comprises one or more of the following features, taken in all technical possible combinations:
  the pick-up section comprises a dirt outlet through which dirt taken off the harvested root crop is evacuated and which is defined by the or each cleaning member and situated under the or each cleaning member when the pick-up member is in the pick-up position;
  the cleaning adjustment device is adapted to adjust a slope S of a slope plane SP spanned by the pick-up member and the cleaning member with respect to the pick-up plane PP, when the pick-up member is in the pick-up position;
  the intermediate section comprises a first intermediate section part and a second intermediate section part, wherein the pick-up section is attached to the first intermediate section part, wherein the cleaning adjustment device comprises a cleaning adjustment pivot which rotatably connects the first intermediate section part to the second intermediate section part and wherein the cleaning adjustment device, for adjusting the position of the cleaning member between the cleaning positions, is adapted for pivoting the first intermediate part with respect to the second intermediate part of the intermediate section about the cleaning adjustment pivot;
  the cleaning adjustment device comprises a linear actuator, in particular a hydraulic cylinder, preferably a variably adjustable hydraulic cylinder or a two-position hydraulic cylinder, and wherein in particular a movement of this linear actuator pivots the first intermediate section part with respect to the second intermediate part about the cleaning adjustment pivot;
  the pick-up apparatus comprises a frame section, and wherein the intermediate section is connected to the frame section;
  it is the second intermediate section part which is adapted for being connected to the frame section;
  the pick-up apparatus comprises a pick-up adjustment device, wherein the pick-up adjustment device comprises a frame pivot connecting the intermediate section to the frame section, in particular the pick-up adjustment device comprising a variably adjustable hydraulic cylinder, a movement of this variably adjustable hydraulic cylinder pivoting the intermediate section with respect to the frame section about the frame pivot;
  the cleaning adjustment device, is adapted to, during adjusting, rotating the first intermediate section part with respect to the second intermediate part about the adjustment pivot, rotating the second intermediate section part about the frame pivot and rotating the first intermediate section part about a pick-up adjustment pivot;
  the pick-up apparatus comprises a supplementary pick-up section which comprises a supplementary pick-up adapted to pick-up the harvested root crop, and at least one supplementary cleaning member adapted to clean the root crop, and wherein the intermediate section carries the supplementary pick-up section, the pick-up section extending on a first lateral side of a center plane MP-MP of the pick-up apparatus and the supplementary pick-up section, extending on a second lateral side of the center plane opposite the first lateral side;
  the pick-up section is inclinable about a first axis A-A with respect to the intermediate section and the supplementary pick-up section is inclinable about a second axis B-B with respect to the intermediate section independently of the pick-up section.

BRIEF DESCRIPTION OF THE DRAWINGS

FIG. 1 shows a side view of the pick-up apparatus according to the invention.

FIG. 2 presents a side view of the pick-up apparatus of FIG. 1

FIG. 3 is a top end view of the pick-up apparatus of FIG. 1.

DETAILED DESCRIPTION OF THE INVENTION

The invention will now be described in detail with reference to the drawings. FIGS. 1 to 3 show a pick-up apparatus 10 according to the invention, which is for example part of a non-represented pick-up, cleaning and transfer machine. The pick-up apparatus 10 is adapted to pick up harvested crop, in particular root crop and preferably sugar beets. The harvested crop to be picked-up is arranged on a crop heap.

The pick-up apparatus 10 comprises a pick-up section 20 and a supplementary pick-up section 20', as can be seen on FIG. 3. The pick-up section 20 and the supplementary pick-up section 20' are identical, but mirrored one with respect to another.

For reasons of simplicity, only pick-up section 20 is explained in the following. However, all features also apply to the supplementary pick-up section 20'.

The pick-up apparatus 10, as shown on FIG. 1, is adapted for picking-up harvested root crop 100, in particular sugar beets, for loading them on a truck.

As shown on FIG. 3, the pick-up apparatus 10 defines a pick-up direction PD, which corresponds to the direction in which the pick-up apparatus is moved in order to pick-up the root crop 100. In general, the root crop 100 is piled to a heap extending in the pick-up direction PD. The pick-up apparatus 10 defines a center plane MP-MP which is a median plane of the pick-up apparatus 10.

The pick-up section 20 defines a pick-up plane PP. During picking-up of the root crop, the center plane MP-MP extends generally perpendicular to the pick-up plane PP. The pick-up plane PP is generally the plane on which the root crop 100 are located, for example the soil. The pick-up plane PP can coincide with the wheel contact points of the vehicle onto which the pick-up device 20 is mounted.

The pick-up section 20 comprises a pick-up member 22 configured for picking-up the root crop 100 on the pick-up section 20. The pick-up member 22 is for example a pick-up roller comprising pick-up fingers.

The pick-up section 20 comprises also at least a cleaning member 24 which is adapted to clean the root crop picked-up by the pick-up member 22. The cleaning member 24, or each cleaning member 24 is a cleaning roller, having for example a thread. Generally, the pick-up section 20 comprises at least two cleaning members 24.

The pick-up apparatus 10 comprises an intermediate section 30 and a frame section 40.

The pick-up section 20 is carried by the intermediate section 30 and the intermediate section 30 is attached to the frame section 40.

The pick-up member 22 defines a pick-up position with respect to the pick-up plane PP in which harvested root crop can be picked-up by the pick-up member. In this position, the pick-up member 22 is close to the pick-up plane PP, or in contact with the pick-up plane PP.

The pick-up section 20 comprises a dirt outlet 25 through which dirt which was taken off the root crop 100 is evacuated from the pick-up section 20. The dirt outlet 25 is defined by the cleaning member 24 and situated between the cleaning member 24 and the pick-up plane PP, i.e. during operation under the cleaning member 24.

During operation of the pick-up apparatus, the harvested root crop 100 are picked-up by the pick-up member 22, transferred to the cleaning member 24, and cleaned by the cleaning member 24 while the root crop are on the pick-up section 20. Then the root crop 100 is transferred from the pick-up section 20 on a conveyor (not represented) of the intermediate section 30. The conveyor transports the harvested and cleaned root crop on a truck.

The pick-up section 20 and the supplementary pick-up section 20' are movable with respect to the intermediate section 30 between a transport position and a pick-up position. To this end, the pick-up section 20 is articulated with respect to the intermediate section about a first axis A-A. The first axis A-A is inclined with respect to the central plane MP-MP. Likewise, the supplementary pick-up section 20' is articulated with respect to the intermediate section 30 about a second axis B-B. The second axis B-B is inclined with respect to the central plane MP-MP.

A slope S is defined by a slope plane SP spanned by the pick-up member 22 and the cleaning member 24 with respect to the pick-up plane PP when the pick-up member is in the pick-up position. The cleaning member 24 defining the slope plane SP in case the pick-up section comprises more than one cleaning member is the cleaning member furthest away or furthest downstream of the pick-up member 22. The term downstream means a direction in the slope plane which is substantially opposite to the pick-up direction PD.

The intermediate section 30 carries the pick-up section 20 and comprises a first intermediate section part 301 directed to the pick-up section 20 and a second intermediate part 302 directed away from the pick-up section 20. The first and second intermediate parts 301 and 302 are rotatably connected one to another by a cleaning adjustment pivot 34 around an adjustment axis AX. The adjustment axis AX is perpendicular to the center plane MP-MP.

The first intermediate section 301 is attached to the pick-up section 20 and the second intermediate section part 302 is rotatably connected to the frame section 40 by a frame pivot 42. The frame pivot 42 connects the intermediate section 30 to the frame section 40 rotatably around a frame axis BX. The frame axis BX is perpendicular to the center plane MP-MP.

The pick-up apparatus 10 comprises a pick-up adjustment device 44 which is arranged between the frame section 40 and the intermediate section 30, and which is adapted to rotate the intermediate section 30 in relation to the frame section 40. To this end, the pick-up adjustment device 44 comprises the frame pivot 42. The pick-up adjustment device 44 comprises also a pick-up adjustment cylinder 45. This cylinder 45 is a variably adjustable hydraulic cylinder. The pick-up adjustment cylinder 45 is linked on one of its ends to the frame section 40 and on the other of its ends to the intermediate section 30, more precisely to the first intermediate section 301, via a pick-up adjustment pivot 46.

The pick-up adjustment device 44 therefore allows rotating the intermediate section 30 and the pick-up section 20 with respect to the frame section 40 between at least two pick-up positions. In each of these pick-up positions the distance of the pick-up member 22 to the pick-up plane PP differs from the distance of the pick-up member 22 to the pick-up plane PP in the other pick-up positions. The distance of the pick-up member 22 to the pick-up plane PP can thus be adjusted. During operation of the pick-up adjustment device 44, the configuration of the first intermediate section 301, the second intermediate section 302 and the pick-up section 20 remains constant. In other words, no relative movement takes place between the first intermediate section 301, the second intermediate section 302 and the pick-up section 20 caused by operation of the pick-up adjustment device 44.

The pick-up apparatus 10 comprises a cleaning adjustment device 32 adapted to adjust the position of the or each cleaning member 24 between at least two cleaning positions. These two cleaning positions, of one cleaning member 24 considered, are different one from another. In each of the two cleaning positions of a given cleaning member 24 and while the pick-up member 22 is in the pick-up position, the distance of the cleaning member 24 with respect to the pick-up plane PP of one of the two cleaning positions is different from the distance of this cleaning member 24 with respect to the pick-up plane PP in the other cleaning position of the two cleaning positions. For example, on FIG. 1, the cleaning member 24 furthest downstream, which means also at a cleaning member position furthest from the pick-up member 22, is at a clearing distance DC1 with respect to the pick-up plane PP. On FIG. 2, in which the cleaning adjustment device 32 is in a different configuration than the configuration of FIG. 1, the cleaning member 24 furthest downstream is at a clearing distance DC2 with respect to the pick-up plane PP. DC2 is greater than DC1. However, in both configurations the pick-up member 22 is at the same distance with respect to the pick-up plane PP. The cleaning adjustment device 32 is therefore adapted to adjust the position of the cleaning member 24 with respect to the pick-up member 22 between at least two different cleaning positions. In both cleaning positions, the distance of the cleaning member 24 to the pick-up plane PP is different while the pick-up member 22 is in the pick-up position. The cleaning adjustment device 32 may be continuously adjustable between the at least two different cleaning positions. In other words, while harvested root crop 100 can be picked up by the pick-up member 22 on the pick-up section 20, the height of the cleaning member 24 can be adapted while the position of the pick-up member 22 is not or not significantly changed.

The cleaning adjustment device 32 comprises the cleaning adjustment pivot 34 rotatably connecting the first intermediate section part 301 to the second intermediate section part 302.

The cleaning adjustment device 32 is adapted for rotating the first intermediate section part 301 about the adjustment pivot 34 with respect to the second intermediate section part 302. To this end, the cleaning adjustment device 32 comprises a hydraulic cylinder 33. The hydraulic cylinder 33 is linked on one of its ends to the first intermediate section part 301 and on the other of its ends to the second intermediate section part 302.

The hydraulic cylinder 33 is variably adjustable or is a two-position hydraulic cylinder. As a variant, the hydraulic cylinder 33 can be replaced by any other suitable linear actuator device. The hydraulic cylinder 33 has at least a contracted configuration and an extended configuration. During extension and contraction of the hydraulic cylinder 33, the first intermediate section part 301 and the second intermediate section part 302 are rotated one with respect to the other about the adjustment pivot 34. Furthermore, during extension and contraction of the hydraulic cylinder 33, the first intermediate section part 301 is rotated about the pick-up adjustment pivot 46 and the second intermediate section part 302 is rotated about the frame pivot 42.

Therefore the cleaning adjustment device 32 is adapted to adjust the slope S on which the harvested root crop are cleaned on the pick-up section 20.

The adjustment of height of the cleaning member 24 with respect to the pick-up plane PP allows adjusting the volume below the pick-up section 20 for dirt cleaned off the root crop 100. In consequence, it is less probable that the cleaning member 24 of the pick-up section 20 gets blocked by dirt.

The pick-up adjustment device 44 is variably adjustable and configured for rotating the first intermediate section part 301 with respect to the second intermediate section part 302 about the adjustment pivot 34 while simultaneously the second intermediate section part 302 is rotated about the frame pivot 42 and the first intermediate section part 301 is rotated about the pick-up adjustment pivot 46.

The cleaning adjustment device 32 can comprise a two-position hydraulic cylinder 33. This two-position hydraulic cylinder can only take two defined configurations where each defined configuration corresponds to one of the cleaning positions. Each one of the two defined configurations is for example defined by a stop and preferably corresponds to the maximum extended respectively minimum retracted configuration of the hydraulic cylinder. With the two-position hydraulic cylinder, the use of the cleaning adjustment device 32 is easy for an operator and the controls can be of simple construction.

The pick-up section 20 may comprise a contact element 28 being in contact with the pick-up plane PP and defining a center of a width W of the pick-up section 20. In this case, the slope S is defined by a slope plane SP spanned between the contact element 28 and one cleaning member 24.

The pick-up section 20 and the supplementary pick-up section 20' comprise each one lateral guide element 26 being in contact with the pick-up plane PP.

The pick-up member 22 and the adjacent cleaning member 24 have a common first power source 400, such as a common motor. A first group of cleaning members 24 namely distribution rollers, in particular three cleaning members immediately downstream of the cleaning member 24 have a common second power source 410, such as a motor.

A second group of cleaning members 24, namely cleaning rollers, downstream of the distribution rollers, have a common third power source 420 such as a common motor. The separation of power sources for the different rollers allows adjusting the speed of rotation of the pick-up member 22 and the cleaning members 24 independently from the remaining rollers and to use comparatively small drives. Each of the pick-up section 20 and supplementary pick-up section 20' has its own power sources 400, 410, 420. Only the power sources of the supplementary pick-up section 20' are shown on FIG. 3.

The pick-up member 22 can be a non-moving member, for example a rake.

What is claimed is:
1. A pick-up apparatus for picking up harvested root crop, the pick-up apparatus defining a pick-up plane and comprising:
    a pick-up section, which defines a pick-up direction, and comprises a pick-up member adapted to pick up the root crop, and at least one cleaning member adapted to clean the root crop picked up by the pick-up member, wherein the pick-up member defines a pick-up position with respect to the pick-up plane in which harvested root crop can be picked up by the pick-up member; and
    an intermediate section carrying the pick-up section, wherein the intermediate section comprises a first intermediate section part and a second intermediate section part, wherein the pick-up section is attached to the first intermediate section part; and a cleaning adjustment device adapted to adjust the position of the cleaning member between at least two cleaning positions, the cleaning positions being different one from another, and wherein in each of the cleaning positions of the cleaning member and while the pick-up member is in the pick-up position, the distance of the cleaning member with respect to the pick-up plane is different from the distance of the cleaning member with respect to the pick-up plane in the other cleaning position, wherein the cleaning adjustment device comprises a cleaning adjustment pivot which rotatably connects the first intermediate section part to the second intermediate section part and wherein the cleaning adjustment device, for adjusting the position of the cleaning member between the cleaning positions, is adapted for pivoting the first intermediate section part with respect to the second intermediate section part about the cleaning adjustment pivot.

2. The pick-up apparatus according to claim 1, wherein the pick-up section comprises a dirt outlet through which dirt taken off the harvested root crop is evacuated and which is defined by the or each cleaning member and situated under the or each cleaning member when the pick-up member is in the pick-up position.

3. The pick-up apparatus according to claim 1, wherein the cleaning adjustment device is adapted to adjust a slope of a slope plane spanned by the pick-up member and the cleaning member with respect to the pick-up plane, when the pick-up member is in the pick-up position.

4. The pick-up apparatus according to claim 1, wherein the cleaning adjustment device comprises a linear actuator.

5. The pick-up apparatus according to claim 4, wherein the linear actuator is a hydraulic cylinder.

6. The pick-up apparatus according to claim 5, wherein the hydraulic cylinder is a variably adjustable hydraulic cylinder or a two-position hydraulic cylinder.

7. The pick-up apparatus according to claim 4, wherein a movement of the linear actuator pivots the first intermediate section part with respect to the second intermediate section part about the cleaning adjustment pivot.

8. The pick-up apparatus according to claim 1, wherein the pick-up apparatus comprises a frame section, and wherein the intermediate section is connected to the frame section.

9. The pick-up apparatus according to claim 8, wherein it is the second intermediate section part which is connected to the frame section.

10. The pick-up apparatus according to claim 8, wherein the pick-up apparatus comprises a pick-up adjustment device, wherein the pick-up adjustment device comprises a frame pivot connecting the intermediate section to the frame section.

11. The pick-up apparatus according to claim 10, wherein the cleaning adjustment device, is adapted to, during adjusting, do the following:
   rotate the first intermediate section part with respect to the second intermediate section part about the cleaning adjustment pivot;
   rotate the second intermediate section part about the frame pivot; and
   rotate the first intermediate section part about a pick-up adjustment pivot.

12. The pick-up apparatus according to claim 1, wherein the pick-up apparatus further comprises:
   a supplementary pick-up section which comprises a supplementary pick-up member adapted to pick-up the harvested root crop, and at least one supplementary cleaning member adapted to clean the root crop, wherein the intermediate section carries the supplementary pick-up section;
wherein the pick-up section extends on a first lateral side of a center plane of the pick-up apparatus and the supplementary pick-up section extends on a second lateral side of the center plane opposite the first lateral side.

13. The pick-up apparatus according to claim 12, wherein the pick-up section is inclinable about a first axis with respect to the intermediate section and the supplementary pick-up section is inclinable about a second axis with respect to the intermediate section independently of the pick-up section.

14. The pick-up apparatus according to claim 10, wherein:
   the pick-up adjustment device comprises a variably adjustable linear actuator, a movement of this variably adjustable linear actuator is adapted to pivot the intermediate section with respect to the frame section about the frame pivot; and
   the variably adjustable linear actuator is linked on one of its ends to the frame section and on the other of its ends to the first intermediate section part via a pick-up adjustment pivot.

15. The pick-up apparatus according to claim 14, wherein the variably adjustable linear actuator is a hydraulic cylinder.

* * * * *